(12) United States Patent
Matacotta et al.

(10) Patent No.: US 6,334,987 B1
(45) Date of Patent: Jan. 1, 2002

(54) CATALYSTS FOR THE FULL OXIDATION OF VOLATILE ORGANIC COMPOUNDS

(75) Inventors: Francesco Cino Matacotta, Trieste; Gianluca Calestani, Parma; Fabrizio Cavani, Modena; Giuseppe Fornasari, Cremona, all of (IT)

(73) Assignees: Consiglio Nazionale Delle Ricerche, Rome; Universita' Degli Studi Di Bologna, Bologna, both of (IT)

( * ) Notice: Subject to any disclaimer, the term of this patent is extended or adjusted under 35 U.S.C. 154(b) by 0 days.

(21) Appl. No.: 09/117,388

(22) PCT Filed: Feb. 10, 1997

(86) PCT No.: PCT/EP97/00599
§ 371 Date: Jul. 29, 1998
§ 102(e) Date: Jul. 29, 1998

(87) PCT Pub. No.: WO97/28887
PCT Pub. Date: Aug. 14, 1997

(30) Foreign Application Priority Data

Feb. 12, 1996 (IT) ................................. B096A0063
Jul. 2, 1996 (IT) ................................. B096A0362

(51) Int. Cl.[7] .................................... B01D 53/62
(52) U.S. Cl. ................................... 423/245.3; 423/437.1; 423/437.2; 423/247
(58) Field of Search .................. 423/437.2, 245.3, 423/247

(56) References Cited

U.S. PATENT DOCUMENTS

| 4,242,213 A | 12/1980 | Katsube et al. | 501/136 |
|---|---|---|---|
| 4,859,648 A | 8/1989 | Landis et al. | 502/242 |
| 5,055,512 A | 10/1991 | Kauffman et al. | 524/413 |
| 5,238,913 A | 8/1993 | Coppa | 505/413 |
| 5,240,646 A * | 8/1993 | Gillet et al. | 423/598 |

OTHER PUBLICATIONS

Halasz, I., Oxidatian or Carbon Monoxide over Barium Cuprate Catalytic in *Catalysts Letters* 6 (1990) pp. 349–360, no month.*

Database WPI—Section Ch, Week 9202—Derwent Publications LTD., London, GB; Class H04, AN 92–014544–XP002044267&SU 1641416A (As Sibe Catalysis), Apr. 15, 1991—See abstract.

* cited by examiner

*Primary Examiner*—Stuart Hendrickson
(74) *Attorney, Agent, or Firm*—Guido Modiano; Albert Josif; Daniel O'Byrne

(57) ABSTRACT

A catalyst for the full oxidation of volatile organic compounds (VOC), particularly hydrocarbons, and of CO to $CO_2$, which comprises a compound having the formula $$A_2B_3O_{6\pm d}$$

Figure 1:
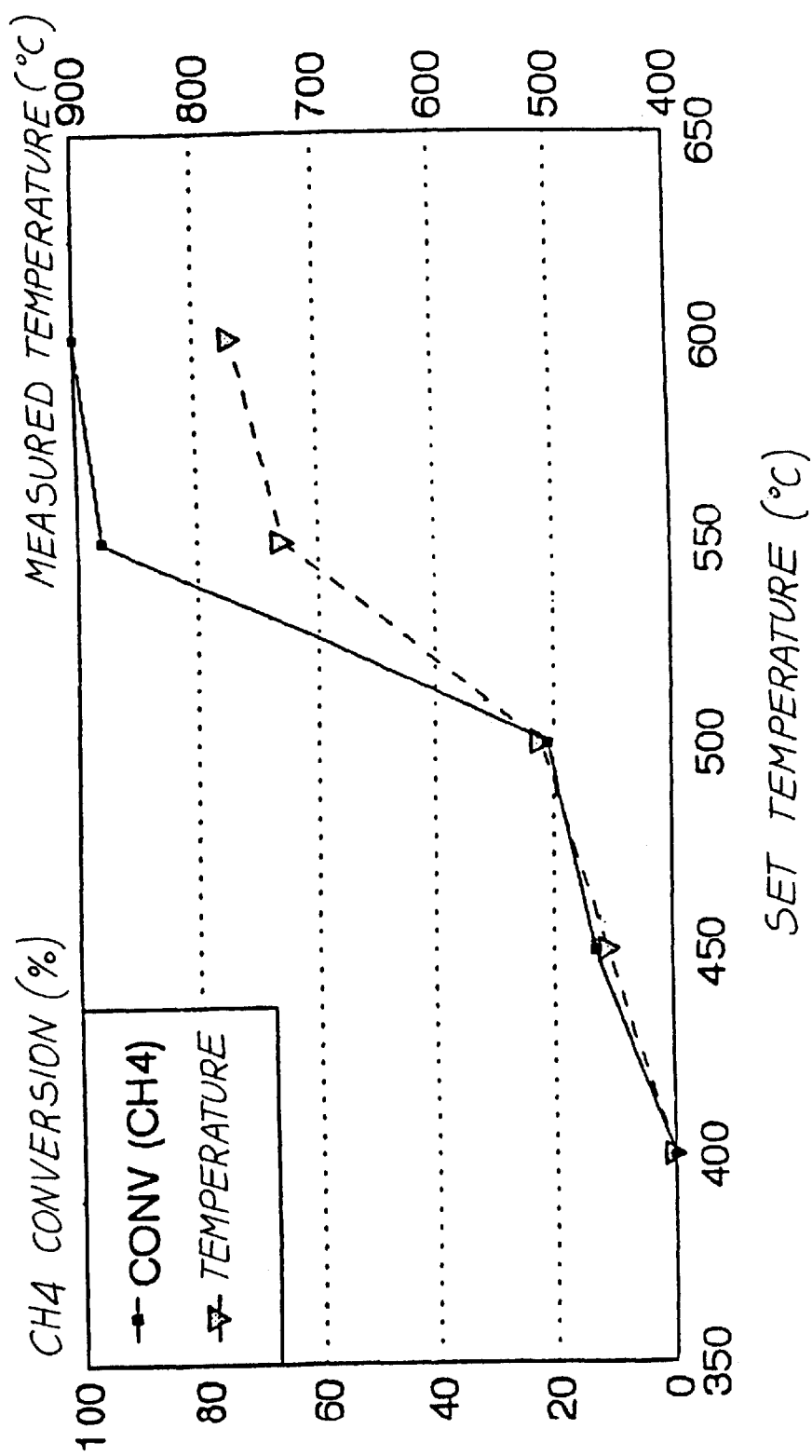

where A is an alkaline-earth metal, an alkaline metal, a lanthanide, or a solid solution thereof, B is a transition metal, an element of group III, or a solid solution thereof, and d has a value between 0 and 1; and a method for the full oxidation of volatile organic compounds using the catalyst.

6 Claims, 4 Drawing Sheets

GHSV=80000 CH4/Air =2/98 v/v

GHSV=40000 CH4/Air =4/96 v/v

GHSV=40000 CH4/O2/He=2/1/4 v/v

CATALYSTS FOR THE FULL OXIDATION OF VOLATILE ORGANIC COMPOUNDS

This is a national stage application of POT/EP97/00599, filed Feb. 10, 1997.

BACKGROUND OF THE INVENTION

The present invention relates to catalysts for the full oxidation of volatile organic compounds (VOC), particularly hydrocarbons, and to a method for the full oxidation of volatile organic compounds (VOC) by using said catalysts.

The total combustion of VOC to $CO_2$ and $H_2O$ becomes necessary in view of the toxicity and environmental impact of most unburnt VOC. The goal is to minimize both the release of VOC into the atmosphere and the formation of CO, which is also a toxic component.

The catalysts mostly used for VOC combustion are:

a) catalysts based on noble metals, which are characterized by a high cost but by excellent performance in terms of VOC conversion, said catalysts operating at temperatures between 200 and 450° C. according to the reactivity of the compound;

b) catalysts based on mixed oxides, typically chromites of copper or of other metals, or barium hexaaluminate, which are characterized by a lower cost but are active in more drastic conditions (temperatures between 400 and 600° C.). This second class of catalysts is also used for catalytic combustors for power generation units. In this case, they operate at temperatures above 900° C.

Conventional catalysts used for the combustion of VOC are not free from drawbacks, i.e., high cost (for those based on noble metals) and poor activity (for the second class, accordingly requiring operation at higher temperatures, in conditions in which morphologic or structural transformations are facilitated).

SUMMARY OF THE INVENTION

A principal aim of the present invention is to eliminate the drawbacks of conventional catalysts for the oxidation of VOC, particularly catalysts for the full oxidation of VOC.

This aim and other objects which will become apparent hereinafter from the following detailed description of the invention are achieved by catalysts according to the present invention, which comprise one or more crystalline compounds having the formula $$A_2B_3O_{6\pm d}$$

where A is an alkaline-earth metal, an alkaline metal, a lanthanide, or a solid solution thereof, B is a transition metal, an element of group III, or a solid solution thereof, and d has a value between 0 and 1.

Advantageously, A is chosen from the group constituted by barium, cesium, potassium, strontium, and solid solutions thereof.

Conveniently, B is chosen from the group constituted by copper, nickel, manganese, iron, palladium, titanium, aluminum, gallium, zinc, cobalt, and solid solutions thereof.

Examples of catalysts according to the invention, wherein A is a solid solution of the above-mentioned cations, include compounds having the formula $$(Ba_{2-x}Sr_x)Cu_3O_{6\pm d}$$

with values of x up to 0.75.

Other examples of catalysts according to the invention, wherein B is a solid solution of the above-mentioned cations, have the formula $$(Ba_2Cu_{3-y}Pd_y)O_{6\pm d}$$

with y up to 0.33;

$$Ba_2(Cu_{3-y}Ni_y)O_{6\pm d}$$

with y up to 1.0.

Methods for preparing the compounds included in the catalysts according to the present invention are disclosed in Italian patent application BO 96 A 000063. Said patent application describes the use of these compounds to fix gases, composite materials comprising said compounds, films made by said compounds, gas fixing devices comprising said compounds, and electrical and optical gas concentration sensors comprising said compounds.

The catalysts for catalytic combustion according to the present invention are characterized by a high activity, comparable with that provided by the more expensive noble metals, by a high resistance to temperature and to extreme operating conditions, by low cost and easy production even in the form of compounds and thin films. Moreover, differently from any material hitherto known, they are totally selective for carbon dioxide, $CO_2$, with respect to carbon monoxide, CO. This means that in any operating condition for the catalysts according to the present invention the only carbon oxide produced by the reaction is $CO_2$.

The present invention also relates to methods for the full oxidation of VOC which use the catalysts according to the present invention.

The methods for the full oxidation of VOC according to the present invention relate to the full oxidation of VOC in combustion chambers or in afterburning chambers or in combustion-gas chambers.

The oxidation reaction occurs in a fixed bed or in a fluidized bed.

The catalysts according to the present invention lead to full oxidation of VOC. In this manner, the gas mixture produced by the oxidation of the VOC does not contain carbon monoxide but contains only carbon dioxide. In this manner, the operations for eliminating carbon monoxide, and the known negative consequences of its presence in the environment, are avoided. Moreover, by oxidizing the carbon monoxide to carbon dioxide, the full potential of the VOC Oxidation reaction is utilized, with obvious advantages in terms of energy.

The Applicants have found that the total VOC oxidation reaction in the presence of the catalysts according to the invention occurs with a high conversion of VOC even at low temperatures.

Moreover, the Applicants have found that the catalysts according to the present invention allow full oxidation of VOC even in conditions entailing a significant oxygen deficit.

Besides, it has been found that the catalytic activity of the catalysts according to the present invention is not negatively affected by prior heating under reaction up to high temperatures (for example up to 920° C.) and cooling to ambient temperature.

Moreover, analysis of reaction selectivity data suggests that the catalysts according to the present invention are capable of directly converting CO to $CO_2$ at temperatures above 250° C. and in the presence of even minimal oxygen concentrations.

The catalysts according to the present invention and the oxidation method according to the present invention will be described in greater detail hereinafter with examples which are presented only by way of non-limitative example.

EXAMPLE 1
Catalytic Combustion of Methane

From a molecule-reactivity standpoint, methane is to be considered as difficult to oxidize. The required reaction conditions are extremely drastic if compared with other paraffins, olefins, or volatile organic compounds. Tests that have been conducted have shown that the compound according to the invention is capable of oxidizing methane at relatively low temperatures: this is an indicator of the high full-oxidation ability of the compound according to the invention. As regards other volatile organic compounds, full combustion is thought to occur at temperatures that are significantly lower than those observed for methane. These indications have been confirmed by the tests conducted with butane and can therefore be extended to the other VOC.

A catalyst containing $Ba_2Cu_3O_6$ was used in tests for the catalytic combustion of methane. The tests are conducted in a fixed-bed quartz microreactor with a diameter of 4 mm, which contains 500 mg of catalysts in granules having dimensions between 20 and 30 mesh. The catalyst is a composite material constituted by an inert porous substrate ($Al_2O_3$) which contains 3.5% by weight of active compound (17.5 mg). Methane and air are fed to the reactor so that the methane concentration is equal to 2% by volume in the first test and equal to 4% by volume in the second test.

The tests are conducted at atmospheric pressure and at a space velocity, expressed as GHSV (gas hourly space velocity; hourly fed volumetric flow-rate/volume or weight of catalyst), of 80,000 $cm^3$/g.hour in the first test and of 40,000 $cm^3$/g.hour in the second test. The mixture of reaction products was analyzed by gas chromatography. The only products formed in both tests were carbon dioxide and water.

Figure 2:
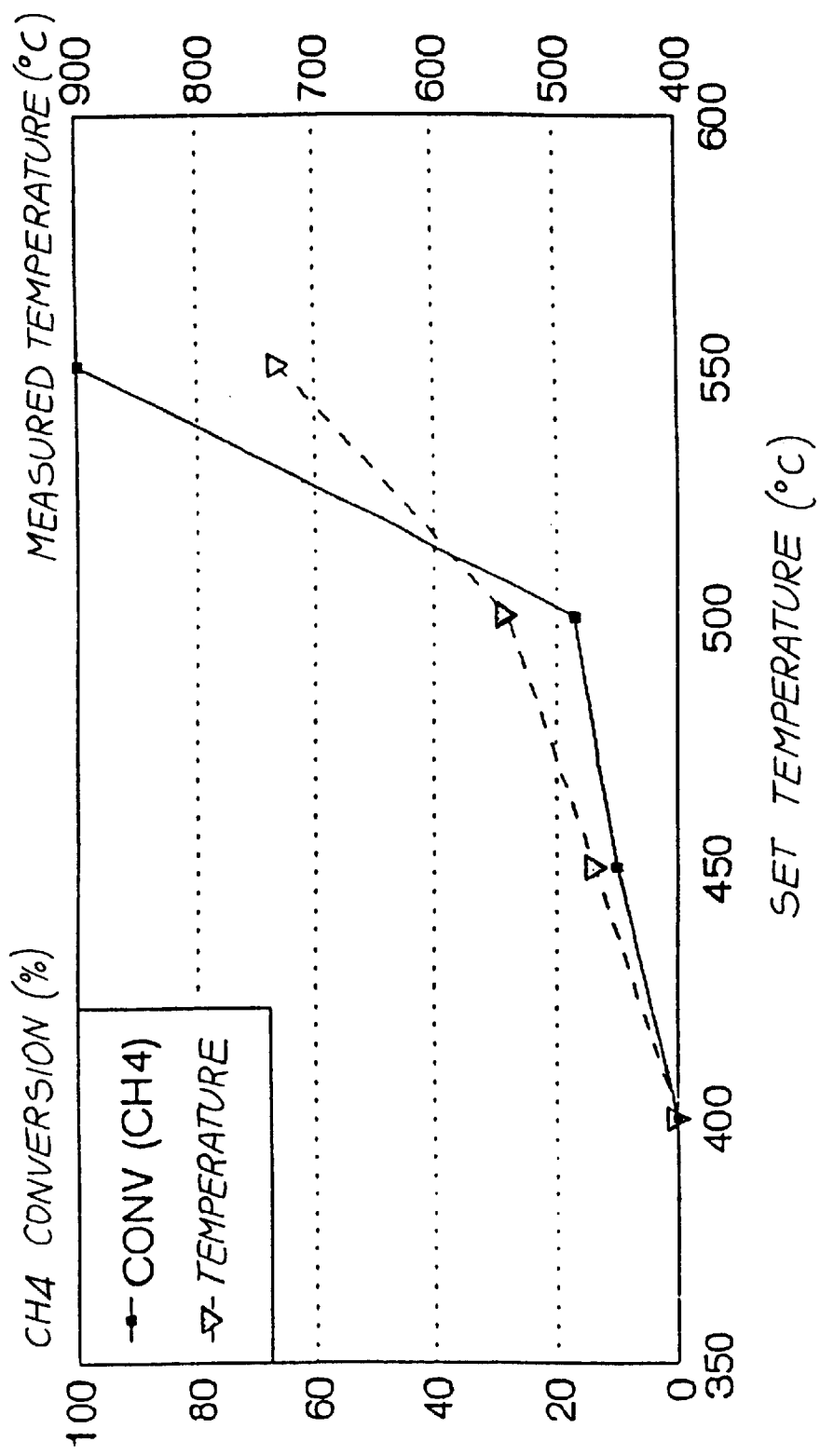

The results of the first and of the second tests are given respectively in FIGS. 1 and 2, where the term "conversion" relates to the percentage in moles of converted methane with respect to the moles of supplied methane. The expression "set temperature" relates to the temperature of the mixture of gases fed to the reactor and the expression "measured temperature" relates to the temperature of the gas mixture at the outlet of the reactor, which is considered equal to the temperature of the catalyst.

EXAMPLE 2
Combustion Test in a Thermal Cycle

The catalyst according to the example was used in a catalytic methane combustion test carried out in a thermal cycle. The test was conducted in a quartz fixed-bed microreactor with a diameter of 4 mm, which contained 500 mg of catalyst (equal to the catalyst of Example 1) in granules having dimensions between 20 and 30 mesh. Methane and air are fed to the reactor so that the methane concentration is equal to 2% by volume.

The test is conducted at atmospheric pressure and at a space velocity, expressed as GHSV, of 90,000 $cm^3$/g h. Catalytic activity was analyzed as a function of the temperature and therefore the reaction temperature was increased to 920° C. and the catalyst was kept in these conditions for 5 hours. Finally, the system was cooled to 400° C. and catalytic activity was analyzed as a function of temperature. The mixture of reaction products was analyzed by gas chromatography. The only products that formed were carbon dioxide and water. The results of the activity tests are given in Table A, where the term "econversion" relates to the percentage of moles of converted methane with respect to the moles of fed methane.

TABLE A

| | Test in thermal cycle | |
|---|---|---|
| Temperature (C) | Conversion 1st cycle (%) | Conversion after 5 h at 920° C. (%) |
| 400 | 0 | 0 |
| 450 | 17 | 16 |
| 500 | 19 | 19 |
| 550 | 37 | 38 |

At the end of the thermal cycle, activity was unchanged and the discharged catalyst showed a surface area of 116 $m^2$/g, unchanged with respect to the initial one, which was of 122 $m^2$/g.

This test demonstrates the good thermal stability of the catalysts used in the present invention.

EXAMPLE 3
Tests for the Combustion of Methane in Reducing Conditions

The catalyst according to the example was used in tests for the combustion of methane in oxygen deficit conditions. The tests were conducted in a fixed-bed quartz microreactor having a diameter of 4 mm, which contained 200 mg of catalyst (equal to the catalyst of Example 1) in granules measuring 20 to 30 mesh. The reactor is fed with methane and air so that the ratio between methane and oxygen is 2 (vol/vol) in the first test and 5 (vol/vol) in the second test.

The test is conducted at atmospheric pressure and at a space velocity, expressed as GHSV, of 40,000 $cm^3$/g h. The mixture of the reaction products was analyzed by gas chromatography. The only resulting products were carbon dioxide and water.

Figure 3:
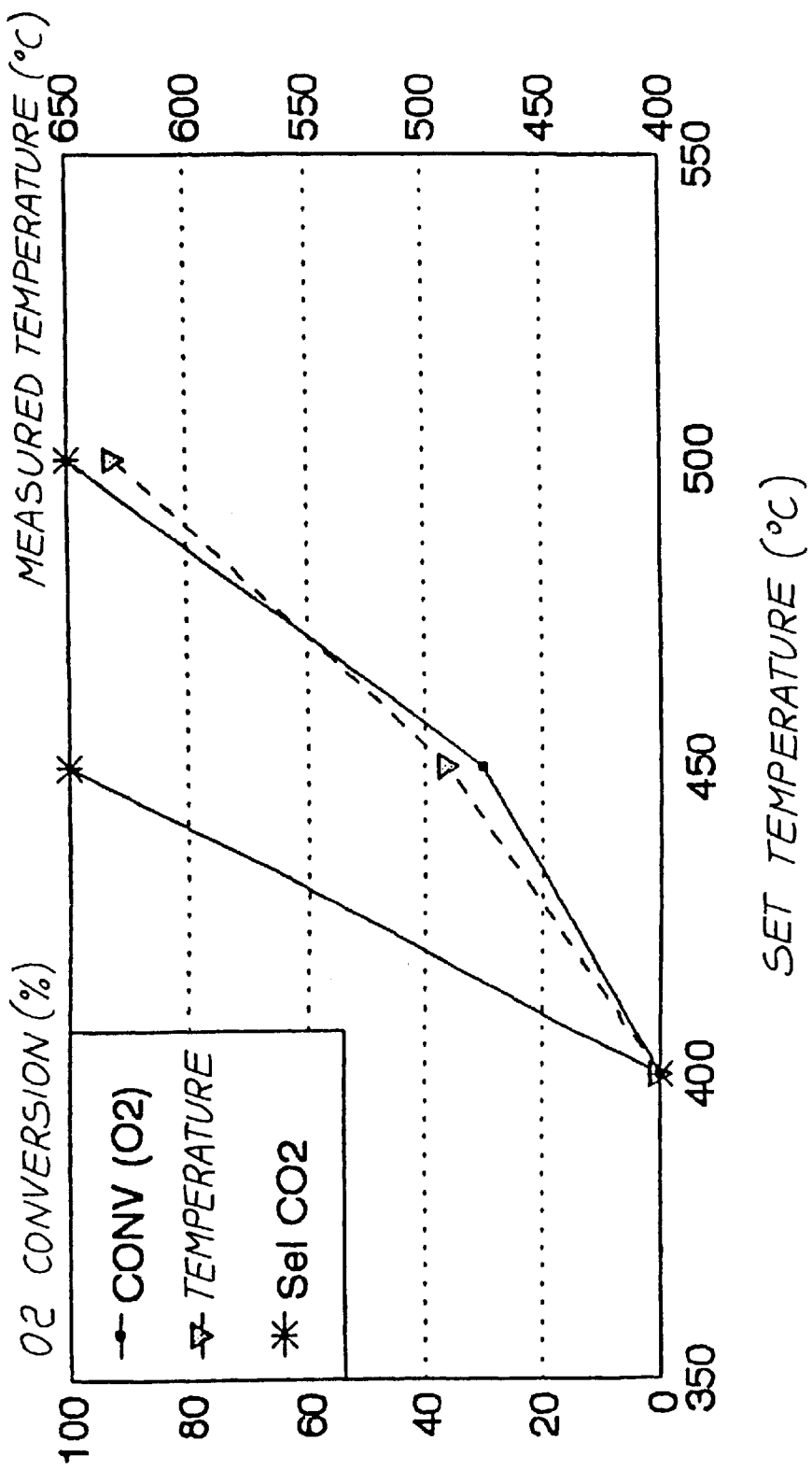
Figure 4:
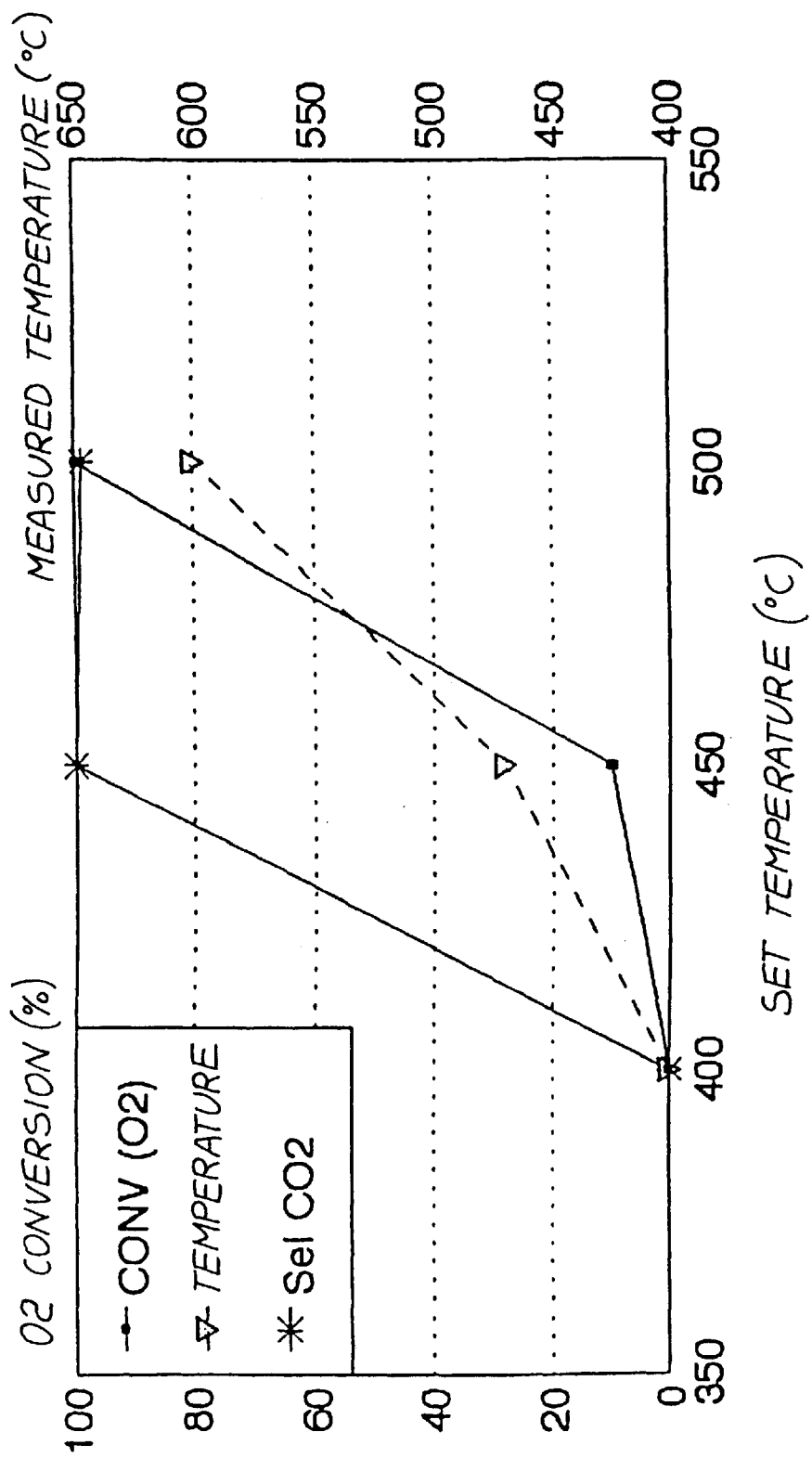

The results of the activity tests are listed in FIGS. 3 and 4, where the term "conversion" relates to the percentage of converted methane moles with respect to the fed methane moles.

The complete absence of CO in methane combustion tests conducted in oxygen deficit conditions is particularly significant. The combustion of methane at low temperature and with amounts of oxygen that are well below the stoichiometric ratio generally leads to the formation of incomplete combustion products, such as CO. The complete absence of CO therefore ensures that only full combustion products, such as $CO_2$ and $H_2O$, are formed even in drastic conditions and outside the conventional utilization ranges. This result is particularly relevant since with catalysts currently in use it is necessary to operate with an abundant excess of oxygen in order to facilitate combustion to $CO_2$. The claimed catalysts can operate with a low oxygen/VOC ratio; this makes the conversion efficiency independent of the oxidizing properties of the reaction atmosphere, and this is an undoubtedly advantageous fact.

EXAMPLE 4
Catalytic Combustion of N-butane

The tests were conducted in a laboratory flow reactor operating at atmospheric pressure. 2 g of catalyst, containing 70 mg of $Ba_2Cu_3O_6$ on a porous inert substrate ($Al_2O_3$) with particles having a diameter of about 0.5 mm, are loaded. A mix constituted by n-butane (1.7% molar) in air is fed so as to provide a contact time (expressed as ratio between the catalyst volume and the volumetric feed flow-rate measured in normal conditions) which can vary between 0.7 and 4.4 seconds (results shown in Table B), or a contact time set to 4.4 seconds and a temperature that can vary between 320 to 480° C. (results shown in Table B). The n-butane ignition temperature can be extrapolated from the table data and is between 280 and 300° C.

TABLE B

Oxidation of n-butane

| Contact time (s) | Temperature (° C) | Conversion to n-C$_4$H$_{10}$ (%) |
|---|---|---|
| 0.7 | 340 | 18 |
| 1.5 | 340 | 32 |
| 2.2 | 340 | 39 |
| 2.9 | 340 | 45 |
| 3.6 | 340 | 51 |
| 4.4 | 340 | 55 |
| 4.4 | 320 | 42 |
| 4.4 | 340 | 55 |
| 4.4 | 360 | 62 |
| 4.4 | 380 | 70 |
| 4.4 | 400 | 77 |
| 4.4 | 420 | 86 |
| 4.4 | 440 | 94 |
| 4.4 | 460 | 100 |

Total lack of carbon monoxide in the combustion products, constituted exclusively by H$_2$O and CO$_2$, is observed.

Table B lists the values of the percentage conversion of n-butane (reacted moles/fed moles) and the yield in CO$_2$ (produced moles of CO$_2$/(supplied moles of n-butane*4)). The experimental characteristics of this example reduce conversion efficiency with respect to the examples given for methane oxidation. Laminar flow and limitation by self-diffusion of the reaction products in fact penalize the efficiency, which nonetheless remains very high.

The catalysts according to the present invention and the total VOC oxidation method according to the present invention can be used with good results for gaseous organic compounds or for organic compounds that vaporize at low temperature, achieving complete combustion at low temperature. The CO$_2$ selectivity of the catalysts according to the present invention is a unique characteristic. The oxidation of VOC, particularly hydrocarbons with catalysts that are not specific for combustion, usually leads to the formation of both CO and CO$_2$. Both products are thermodynamically facilitated in the conditions normally used, and their ratio is therefore usually conditioned by kinetic factors. Accordingly, the specificity of the catalyst in the formation of CO$_2$ is linked to the characteristics of the active centers. CO$_2$ is in fact a primary product, as demonstrated by tests conducted by varying the contact time, and therefore is not the result of the intermediate formation of CO. It is also fair to assume that primary carbon monoxide, i.e., the carbon monoxide that is not produced by the partial oxidation of VOC, is efficiently converted to carbon dioxide at temperatures above 250° C. and in the presence of low oxygen concentrations.

The catalysts according to the present invention and the process for the full oxidation of gaseous organic compounds can be used to reduce or eliminate many noxious components from the combustion gases generated in any manner, for example from very large scale facilities for generating electric power down to small combustors for domestic use, including important applications in the engine field and in the field of vehicles with internal-combustion engines.

The selectivity of the CO$_2$ yield also makes the use of the catalysts according to the present invention particularly interesting in combustors for closed spaces (gas stoves, water heaters for sanitary use, cooking devices, etcetera) where the presence of CO in the combustion products is notoriously a serious health hazard.

What is claimed is:

1. A method for full oxidation of volatile organic compounds (VOC) comprising the step of contacting the volatile organic compound with a catalyst comprising a compound having the formula $$A_2B_3O_{6\pm d}$$

where A is an alkaline earth metal or an alkali metal, B is an element of group III, or a solid solution of said compounds, and d has a value between 0 and 1.

2. The method according to claim 1 wherein the volatile organic compound is a hydrocarbon.

3. A method for full oxidation of volatile organic compounds (VOC), comprising the step of contacting the volatile organic compound with a catalyst comprising a compound or solid solution of compounds selected from the group consisting of Ba$_2$Cu$_3$O$_6$ and (Ba$_{2-x}$Sr$_x$)Cu$_3$O$_{6+/-d}$ with 0<x<0.75 and d having a value between 0 and 1.

4. The method according to claim 3 wherein the volatile organic compound is a hydrocarbon.

5. A method for full oxidation of carbon monoxide comprising the step of contacting the carbon monoxide with a catalyst comprising a compound or solid solution of compounds having the formula A$_2$B$_3$O$_{6+/-d}$ where A is an alkaline-earth metal or an alkali metal, B is an element of group III, and d has a value between 0 and 1.

6. A method for full oxidation of carbon monoxide comprising the step of contacting the carbon monoxide with a catalyst comprising a compound or solid solution of compounds selected from the group consisting of Ba$_2$Cu$_3$O$_6$ and (Ba$_{2-x}$Sr$_x$)Cu$_3$O$_{6+/-d}$ with 0<x<0.75, and d having a value between 0 and 1.

* * * * *